(12) United States Patent
Domingo

(10) Patent No.: US 11,334,541 B1
(45) Date of Patent: May 17, 2022

(54) KNOWLEDGE REPRESENTATION USING INTERLINKED CONSTRUCT NODES

(71) Applicant: Rainer Michael Domingo, Honolulu, HI (US)

(72) Inventor: Rainer Michael Domingo, Honolulu, HI (US)

(*) Notice: Subject to any disclaimer, the term of this patent is extended or adjusted under 35 U.S.C. 154(b) by 0 days.

(21) Appl. No.: 16/931,883

(22) Filed: Jul. 17, 2020

(51) Int. Cl.
*G06F 16/22* (2019.01)
*G06F 16/28* (2019.01)

(52) U.S. Cl.
CPC .......... *G06F 16/22* (2019.01); *G06F 16/284* (2019.01)

(58) Field of Classification Search
CPC ...... G06F 16/22; G06F 16/284; G06F 16/242; G06F 16/2452; G06F 16/254
USPC ........ 707/609, 687, 705, 769, 790, 813, 821
See application file for complete search history.

(56) References Cited

U.S. PATENT DOCUMENTS

| | | | |
|---|---|---|---|
| 7,860,815 B1 | 12/2010 | Tangirala | |
| 7,890,518 B2 | 2/2011 | Aasman | |
| 8,392,353 B2 | 3/2013 | Cho et al. | |
| 9,330,175 B2 | 5/2016 | Bobick et al. | |
| 9,477,779 B2 | 10/2016 | Webber et al. | |
| 2005/0278306 A1* | 12/2005 | Dettinger | G06F 16/242 |
| 2006/0165060 A1* | 7/2006 | Dua | G06Q 20/401 |
| | | | 705/76 |
| 2008/0183687 A1* | 7/2008 | Law | G06F 16/248 |
| 2012/0166373 A1 | 6/2012 | Sweeney et al. | |
| 2012/0179642 A1 | 7/2012 | Sweeney et al. | |
| 2014/0351261 A1 | 11/2014 | Aswani et al. | |
| 2014/0356846 A1* | 12/2014 | Su | G09B 5/02 |
| | | | 434/362 |
| 2019/0220546 A1* | 7/2019 | Cohen | G06F 16/9024 |

* cited by examiner

Primary Examiner — Sana A Al-Hashemi

(57) ABSTRACT

An improved knowledge representation uses interlinked construct nodes to represent knowledge in a uniform and consistent manner across all forms and scopes of knowledge. The node consists of a unique identifier, plurality of data fields, and plurality of paired node linking categories. In its graphical embodiment, the data fields and link categories are superimposed onto a geometric shape. The position of the link categories around the perimeter of the shape identifies the category and relationship to other nodes. Lines between link categories link nodes. Nodes form an interlinked construct node graph. Data fields contain text, images, sounds, symbols, numbers, equations, formulas, digital 3D models and documents. Embodiments of application software are used to create, edit, view, interpret and apply the knowledge contained within a graph.

1 Claim, 17 Drawing Sheets

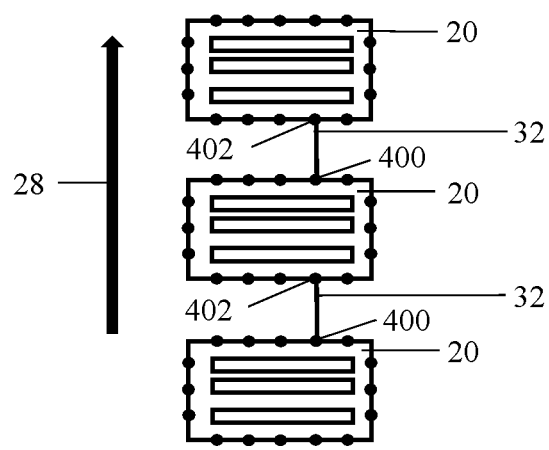
FIG. 7-A

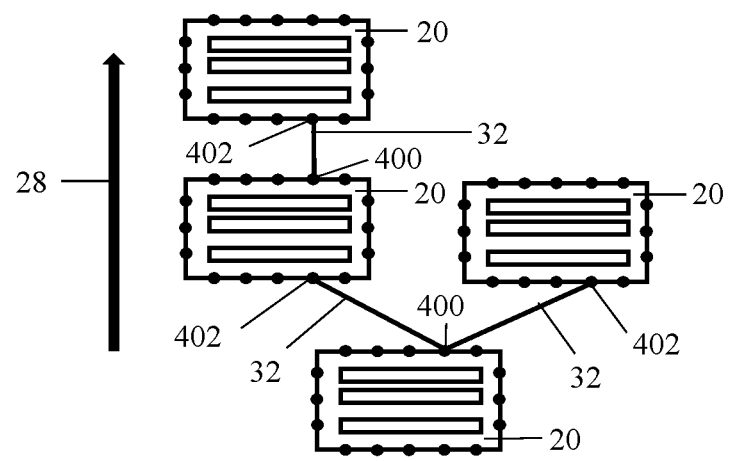
FIG. 7-B

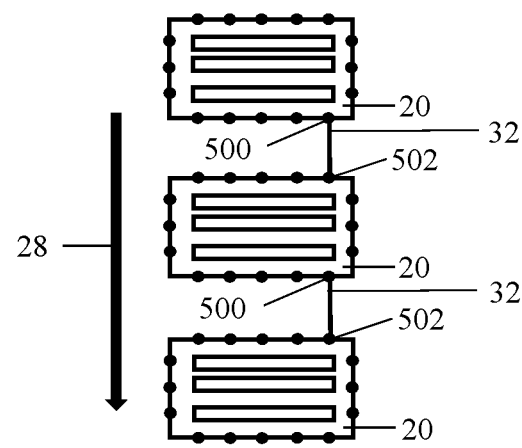
FIG. 8-A

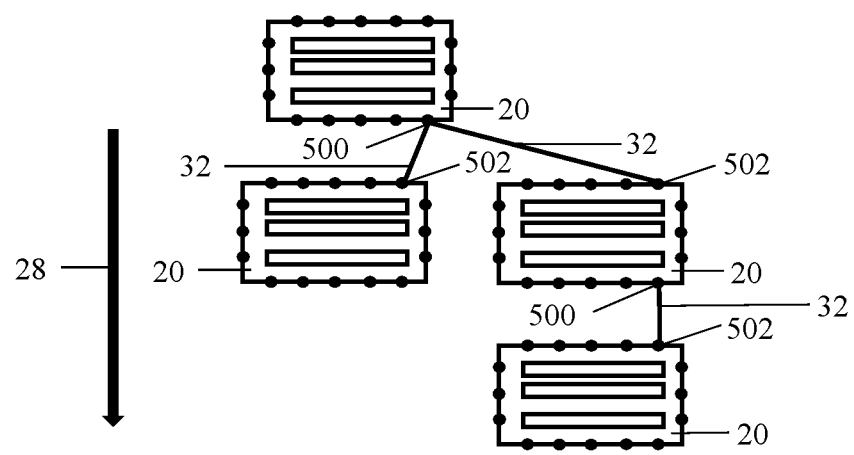
FIG. 8-B

| |
|---|
| Unique identifier |
| Data Field |
| Data Field |
| Data Field |
| Link to inherited construct |
| Link to next property/attribute |
| Link to next human sensory perception/emotion |
| Link to choices |
| Link to previous prerequisite/condition |
| Link to next end state/result |
| Construct Link |
| Link to values |
| Link to next sequence |
| Link to previous end state/result |
| Link to next prerequisite/condition |
| Choice Link |
| Link to previous human sensory perception/emotion |
| Link to previous property/attribute |
| Link previous sequence |
| Value Link |

FIG. 11

KNOWLEDGE REPRESENTATION USING INTERLINKED CONSTRUCT NODES

CROSS-REFERENCE TO RELATED APPLICATIONS

This application claims the benefit of provisional patent application No. 62/875,936, filed on 2019 Jul. 17 by the present inventor.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC OR AS A TEXT FILE VIA THE OFFICE ELECTRONIC FILING SYSTEM

Not Applicable.

STATEMENT REGARDING PRIOR DISCLOSURES BY THE INVENTOR OR A JOINT INVENTOR

Not Applicable.

BACKGROUND

Field of Invention

Embodiments of the invention disclosed herein relates to information technology and more particularly to knowledge representation using graphs.

Relevant Prior Art

| Patent | Kind | Patent Date | Patentee |
| --- | --- | --- | --- |
| U.S. Pat. No. 9,477,779 | B2 | 2016 Oct. 25 | Webber et al. |
| U.S. Pat. No. 8,392,353 | B2 | 2013 Mar. 5 | Cho et al. |
| U.S. Pat. No. 7,860,815 | B1 | 2010 Dec. 28 | Tangirala |
| U.S. Pat. No. 7,890,518 | B2 | 2011 Feb. 15 | Aasman |
| U.S. Pat. No. 9,330,175 | B2 | 2016 May 3 | Bobick et al. |

| Publication | Kind | Pub Date | Applicant |
| --- | --- | --- | --- |
| U.S. 2014/0351261 | A1 | 2014 Nov. 27 | Aswani et al. |
| U.S. 2012/0166373 | A1 | 2012 Jun. 28 | Sweeney et al. |
| U.S. 2012/0179642 | A1 | 2012 Jul. 12 | Sweeney et al. |

There are many knowledge representation (herein "KR") systems that represent knowledge at various levels of detail using a myriad of techniques that include graphs consisting of nodes and edges, property graphs consisting of nodes with attributes and edges, fill in the blank templates, and relational links between conceptual constructs. Although these systems provide the functionality intended by its developers, they require prerequisite subject matter knowledge; are specific in purpose; narrow in focus; or don't provide all there is to know about the knowledge being represented.

Most KR systems are text-based and require the user to understand the words and phrases being used. It's implied that if the user doesn't understand terms or concepts, the user will seek out their meaning using other sources. It's also implied that the user implicitly understands the nuances of labeled edges, or links between nodes or objects that use such broad terms such as "worked on", "affiliated with" or "knows." A disadvantage of existing KR systems is that it's assumed the user already understands the definition, context and nuances of the vocabulary being used.

Knowledge as we know it encompass the entire human process of knowledge acquisition (herein "KA") that consists of learning facts, information and skills of a subject through education and/or experience. The human process of KA involves observing, hearing, touching, smelling, tasting, reading, and doing. Many KR systems simply diagram knowledge using words, phrases and sentences. A disadvantage of existing KR systems is that they are not designed to convey knowledge using non-textual information or other forms of sensory input that can be converted into digital formats.

Implementing every level of detail in a KR system is perceived by many to be too enormous of a task to undertake or impossible to accomplish. As a result, KR systems primarily focus on higher level details. It's assumed the user can breakdown and separate lower levels of detail on their own based on the user's level of understanding of the subject matter or further research. A disadvantage of existing KR systems is that they don't convey all known knowledge about an organism, object, process, event or concept down to the minutest detail.

Types of knowledge are categorized by form and by scope, each of which are broken down into further categories. Given the number of organisms, objects, processes, events and concepts known to us, many KR system developers tend to focus software on specific forms and scopes of knowledge. Some examples are (a) a declarative knowledge system that doesn't include images, (b) a declarative knowledge system with images that can't represent procedural knowledge, and (c) a procedural knowledge system that can't represent priori or posterior knowledge. A disadvantage of existing KR systems is the inability to represent knowledge across all forms and scopes of knowledge.

It's clear that a system is needed to address the shortcomings of existing KR systems. The system shouldn't require prerequisite knowledge of the subject matter to be understood; be broad in purpose, form and scope; be able to convey information beyond textual information; and provide all there is to know about the knowledge that's represented using all means possible.

SUMMARY

In accordance with one embodiment, a knowledge representation system uses interlinked construct nodes to represent knowledge in a uniform and consistent manner across all forms and scopes of knowledge. The node consists of a unique identifier, plurality of data fields, and plurality of paired node linking categories. In its graphical embodiment, the data fields and link categories are superimposed onto a geometric shape. The position of the link categories around the perimeter of the shape identifies the category and relationship to other nodes. Lines between link categories link nodes. Nodes form an interlinked construct node graph. One or more nodes are used to create a knowledge representation of words, phrases, sentences, images, sounds, videos, symbols, equations, formulas, organisms, objects, processes, behaviors, events and concepts.

DRAWINGS—BRIEF DESCRIPTIONS

FIG. 7-A depicts the link to next prerequisite/condition and link to previous prerequisite/condition being used to link two interlinked construct nodes to a construct such that both prerequisites/conditions need to be met for the construct to be applicable.

FIG. 7-B depicts the link to next prerequisite/condition and link to previous prerequisite/condition being used to indicate that one of the two sets of prerequisites/conditions need to be met for a construct to be applicable.

FIG. 8-A depicts the link to next end state/result and link to previous end state/result being used to link two interlinked construct nodes to a construct.

FIG. 8-B depicts the link to next end state/result and link to previous end state/result being used to indicate there are two distinct sets of end states/results.

Figure 9:
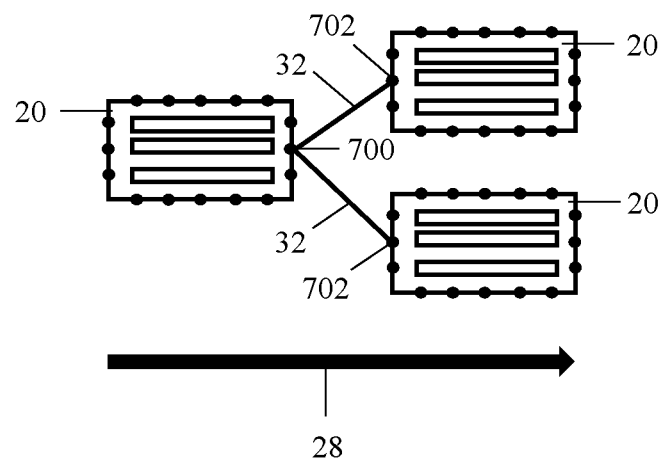

FIG. 9 depicts the link to values and value link being used to indicate there are two values associated with a construct.

Figure 10:
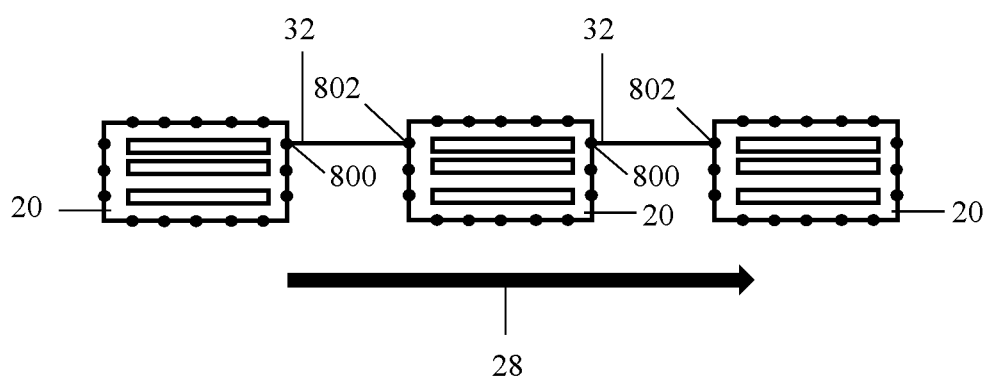

FIG. 10-A depicts the link to next sequence and link to previous sequence being used to indicate there are two sequential steps associated with a construct.

FIG. 10-B depicts the link to next sequence and link to previous sequence being used in conjunction with the link to choices and choice link to show two different sequence paths based on the use of the link to prerequisite/conditions.

Figure 11:
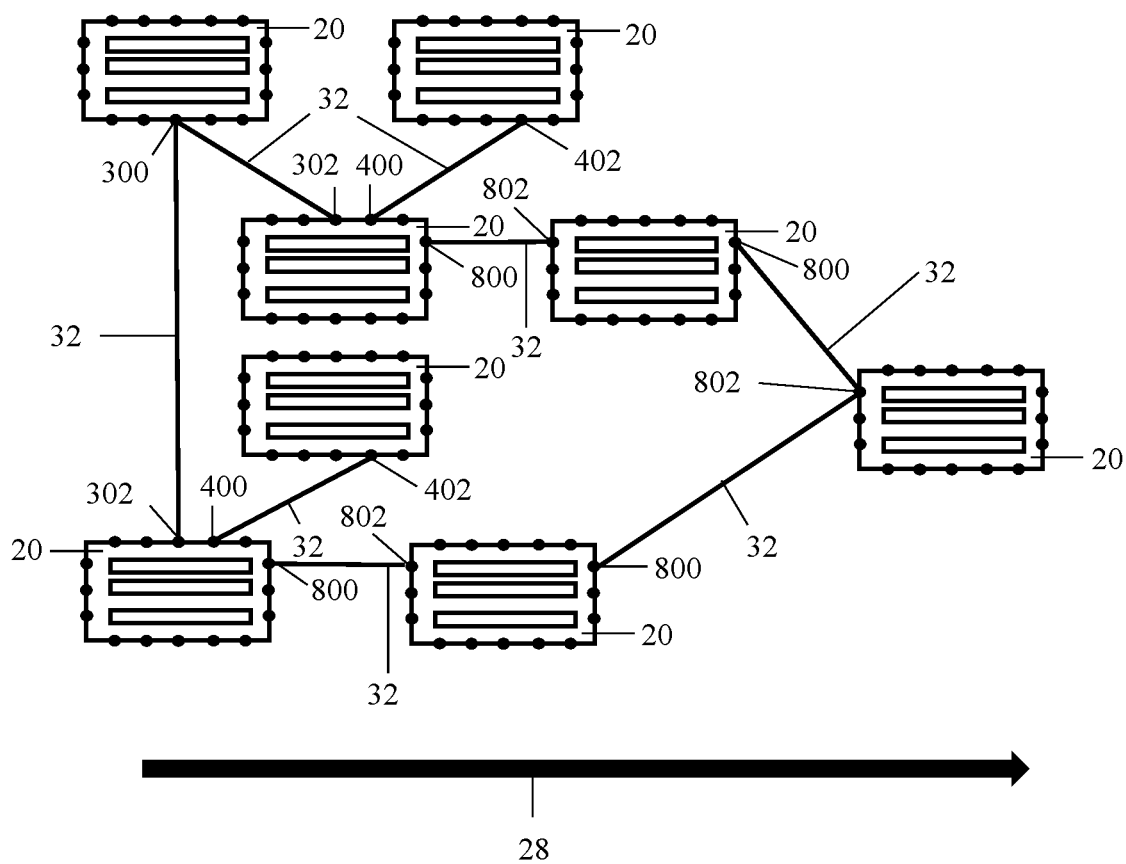

FIG. 11 is an embodiment of a logical record.

Figure 12:
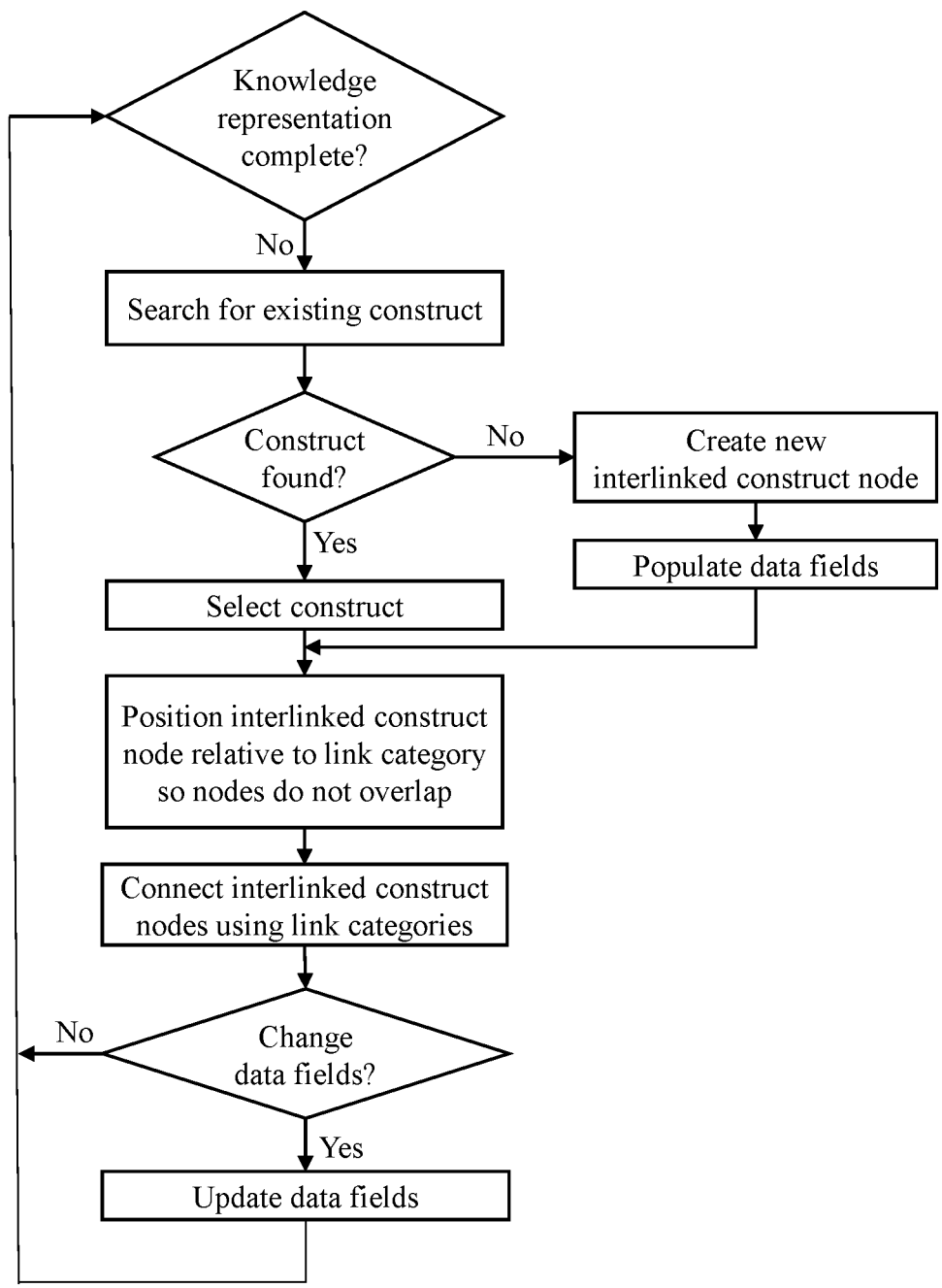

FIG. 12 is a flowchart explaining the process of creating a knowledge representation using the graphical embodiment of an interlinked construct node graph.

Figure 13:
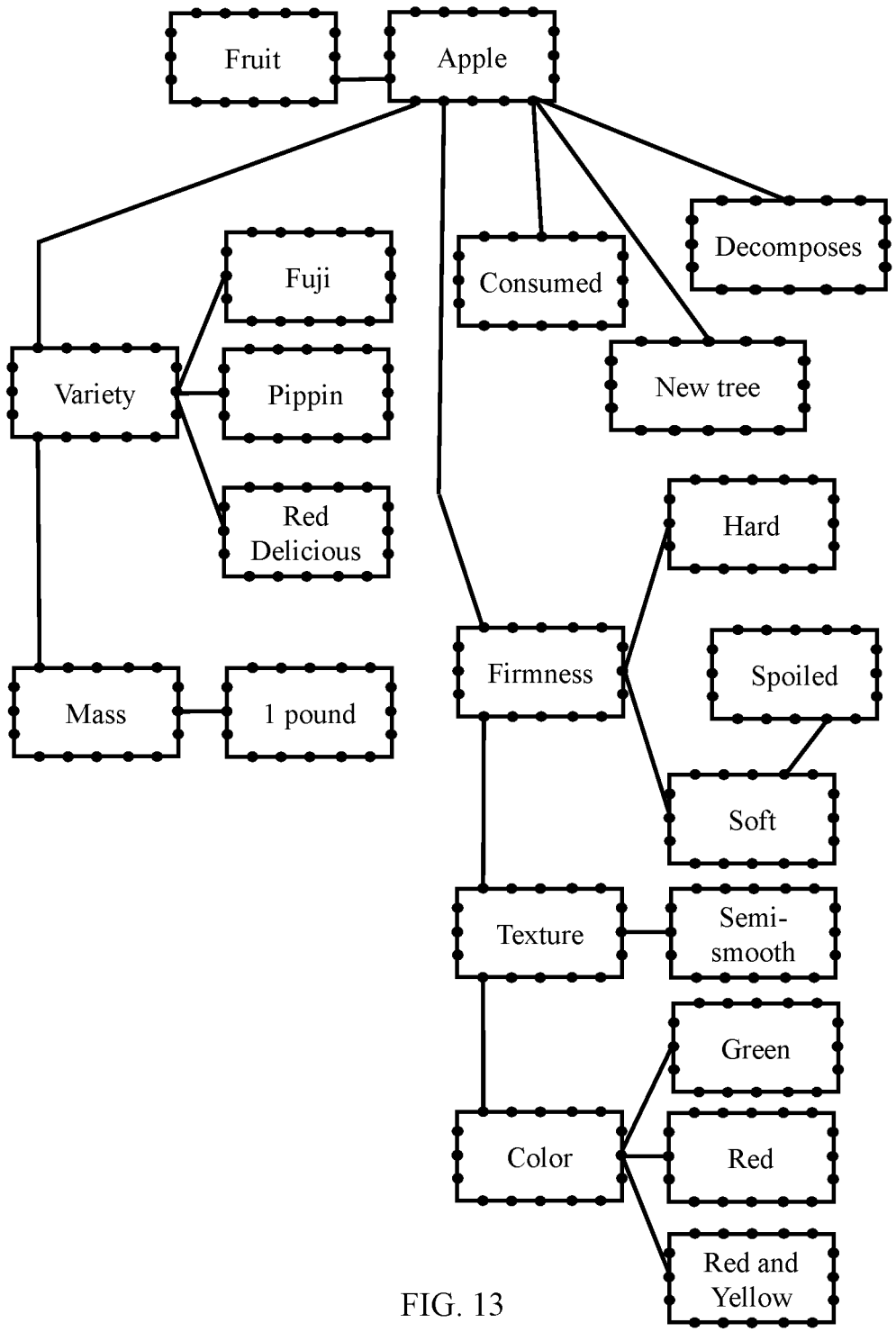
Figure 14:
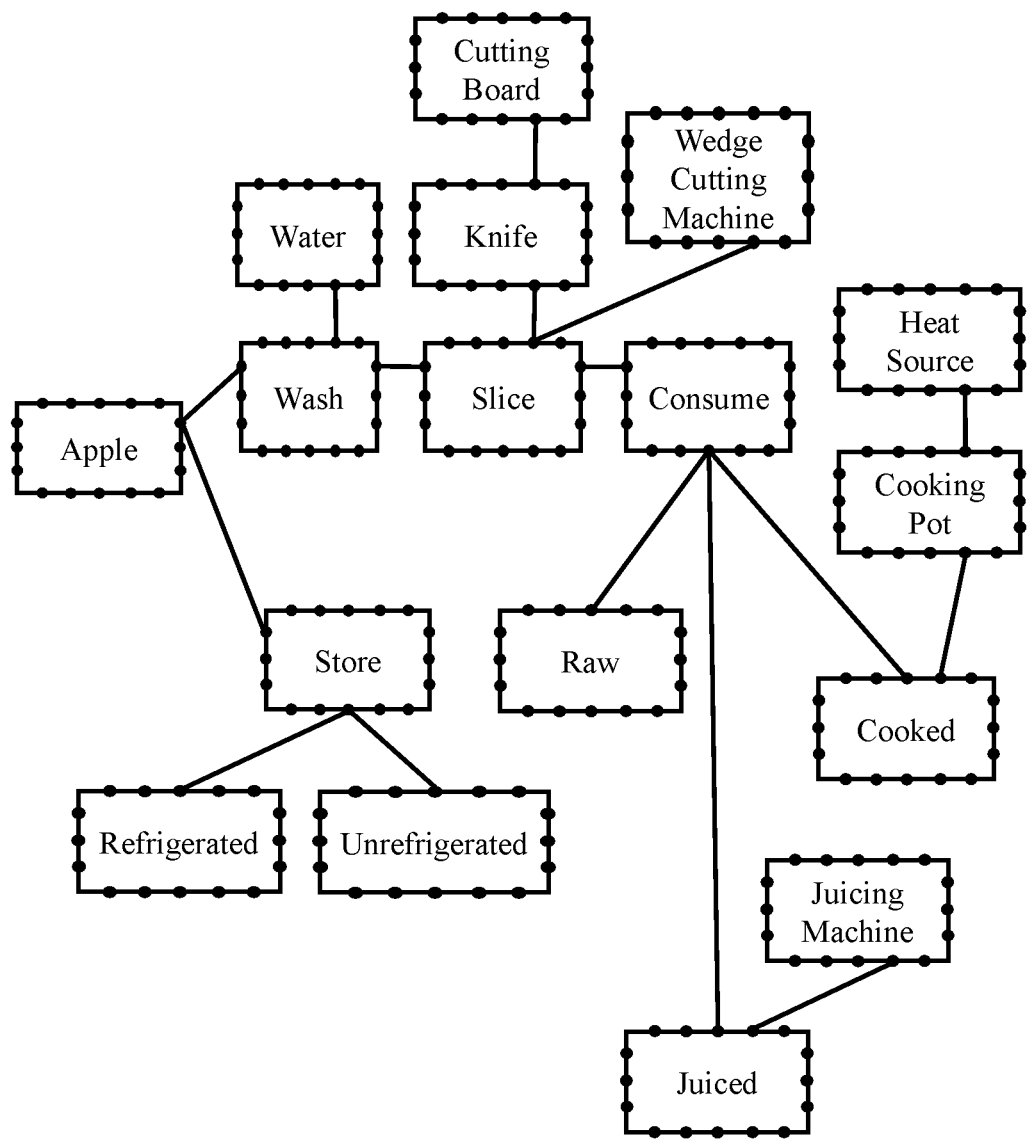

FIGS. 13 and 14 show embodiments of a simplified partial interlinked construct node graph for an apple that uses multiple link categories to illustrate how nodes are linked, laid out and positioned based on link category.

DRAWINGS—REFERENCE NUMERALS

20 Interlinked construct node
22 Root construct node
24 Derived construct node
26 Geometric Shape
28 Direction of flow arrow
30 Data field
32 Lines
100 Link to next property/attribute
102 Link to previous property/attribute
200 Link to next human sensory perception/emotion
202 Link to previous human sensory perception/emotion
300 Link to choices
302 Choice link
400 Link to next prerequisite/condition
402 Link to previous prerequisite/condition
500 Link to next end state/result
502 Link to previous end state/result
600 Link to inherited construct
602 Construct link
700 Link to values
702 Value link
800 Link to next sequence
802 Link previous sequence

DETAILED DESCRIPTION

From this inventor's perspective, everything in our universe as we know it is an organism, object, process, behavior, event or concept containing various physical and conceptual elements. Each of these physical and conceptual elements can be broken further down into constituent physical and conceptual parts that form the individual building blocks of our reality. For the embodiment herein, these individual building blocks are constructs. When all constructs are defined and explained, all known knowledge as we know it is represented.

Figure 1:
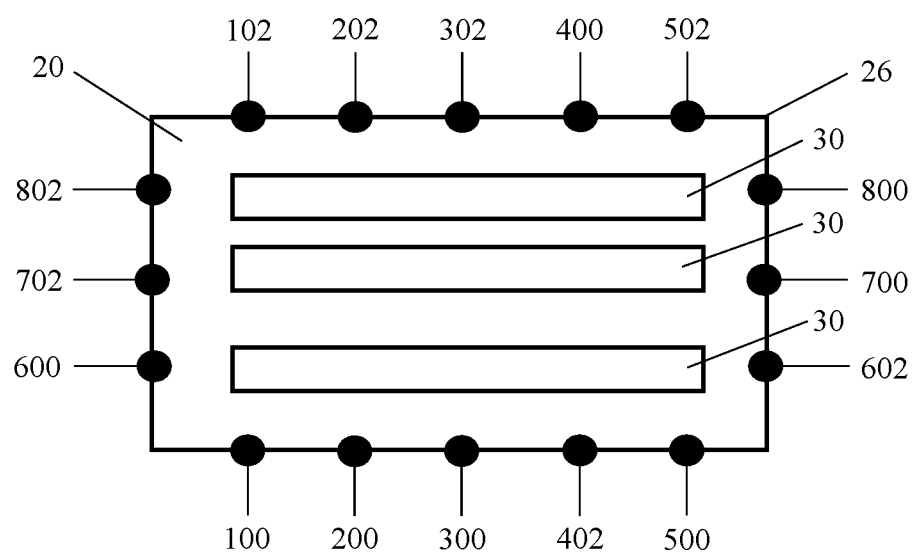
FIG. 1 is a graphical embodiment of an interlinked construct node.

The following describes the use of interlinked construct nodes (herein "ICN") to implement an embodiment of a KR system. A graphical embodiment of an individual ICN 20 is shown in FIG. 1. The ICN 20 is the building block of all KRs. One or more ICNs 20 are used to create a KR of words, phrases, sentences, images, sounds, symbols, equations, formulas, organisms, objects, processes, behaviors, events and concepts. Embodiments of the ICN 20 consist of a unique identifier (herein "ID"), plurality of data fields 30 and plurality of link categories 100-802. The ID, data fields 30 and link categories 100-802 form a logical record as shown in FIG. 11. In the graphical embodiment of an ICN 20, the data fields 30 and link categories 100-802 are superimposed onto an embodiment of a geometric shape 26. Displaying the ID on the graphical embodiment of the ICN 20 is optional.

Embodiments of data fields 30 contain but are not limited to embodiments of text, images, recorded audio, recorded video, symbols, equations, formulas, digital 3D models, documents, or reference to the storage location of these items either locally or remotely. Embodiments of text include but are not limited to a single word, multiple words, phases, sentences, numbers, special characters, equations, formulas, file locations, or universal resource locators (herein "URL"). Data fields 30 may contain a narrative definition or explanation, or computer language syntax.

Figure 2:
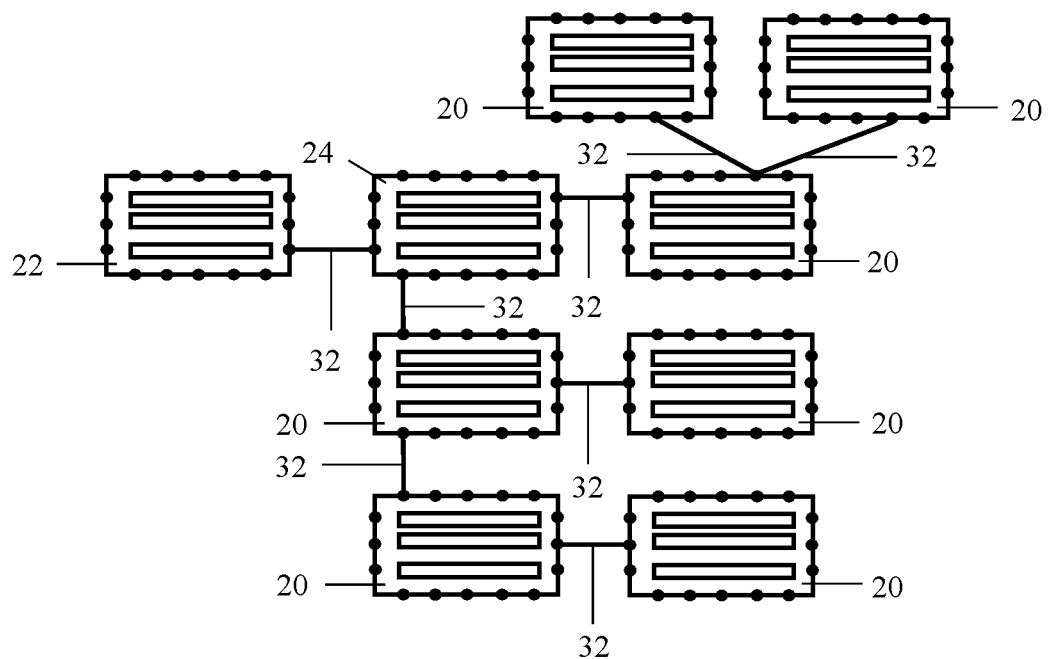
FIG. 2 is a graphical embodiment of an interlinked construct node graph.

In the graphical embodiment of the ICN 20 shown in FIG. 1, the position of the link categories 100-802 around the perimeter of the geometric shape 26 identifies the link category 100-802 and directional relationship to other ICNs 20. Link categories are "paired" and positioned on direct opposite sides of each other around the geometric shape. This pairing allows individual ICNs to be aggregated in a doubly linked list like fashion based on link category. Note that the designations of previous and next herein refer to the logical position of the ICNs in a doubly linked list, with the exception of sequence links, which also specify the previous and next steps for a sequence involving a process, behavior or event. Each paired link category 100-802 of an ICN 20 can link to its matching link category 100-802 of another ICN 20 using the other ICN's ID, and vice-versa. FIG. 2. shows how lines 32 drawn between link categories 100-802 specify how ICNs 20 are interlinked. Arrow heads at the end of lines are not required as the directional relationship between ICNs are designated by the link category. A plurality of ICNs form an ICN graph (herein "IG"). An embodiment of an IG is shown in FIG. 2. The categorical and directional relationship of each link category are the same across all ICNs and IGs.

Figure 3:
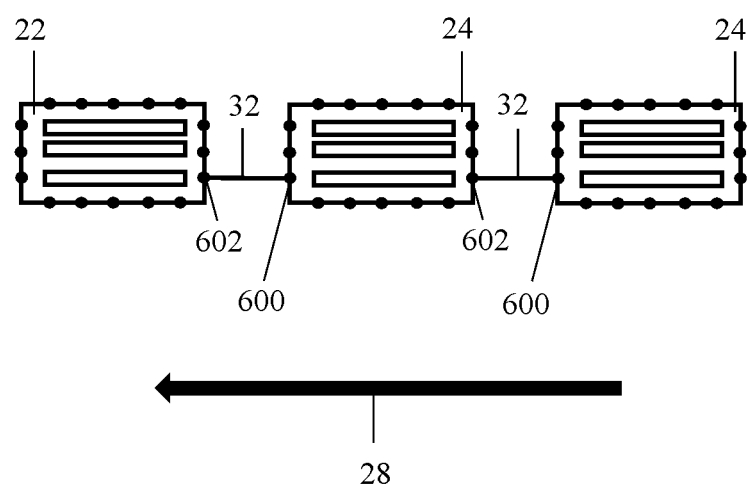
FIG. 3 depicts the link to construct and construct link being used to link a derivative construct node to a root construct node, and link a derivative construct node to another derivative construct node.

A root ICN (herein "RCN" 22) is an ICN 20 that can't be linked to another ICN 20 as the basis of its conceptualization. In other words, it's a top-level construct. An ICN 20 that's linked to another ICN 20 as the basis of its conceptualization is a derived ICN 20 (herein "DCN" 24) as shown in FIG. 3. Derivation also means "inherited from." A DCN 24 can link to another DCN 24, but that doesn't make the DCN 24 that it links to an RCN 22. DCNs automatically inherit ICNs of the RCN or DCN it directly links to, and the inherited ICNs can be referenced or modified as required to expound a construct. RCNs and DCNs are types of ICNs and are generally referred to as ICNs. As shown in FIG. 13, Fruit is a root construct of Apple, as specific aspects of an apple are shared among all physical objects that are classified as fruits.

The embodiment and number of link categories are referred to as a set of paired logical record linking categories or simply paired linking categories (herein "PLC"). The set of PLCs is dependent on the implementation of the IG. Whenever possible, PLCs should be compatible with established standards for global interoperability. For the embodiment described herein, the following set of PLCs are used for illustration purposes as shown in FIG. 1:

Link to inherited construct 600: Link to an RCN 22 or DCN 24 as shown in FIG. 3. A DCN 24 can only link to one ICN 20 as its inherited ICN 20. Multiple DCNs 24 can link to one RCN 22. An RCN 22 shouldn't link to another ICN 20 using this link. The direction of flow for DCNs 24 is right to left as shown by arrow 28. As shown in FIG. 13, Fruit is the root construct of the Apple derived construct, and as such, Fruit is positioned to the left of Apple, as the categorical and directional relationship of the DCN to RCN is right to left.

Construct link 602: Link from one or more DCNs 24 as shown in FIG. 3. The construct link 602 links to the link to inherited construct 600 link. As shown in FIG. 13, Apple is a DCN of the Fruit RCN and connects to the right side of Fruit. DCNs connect to RCNs from right to left.

Figure 4:
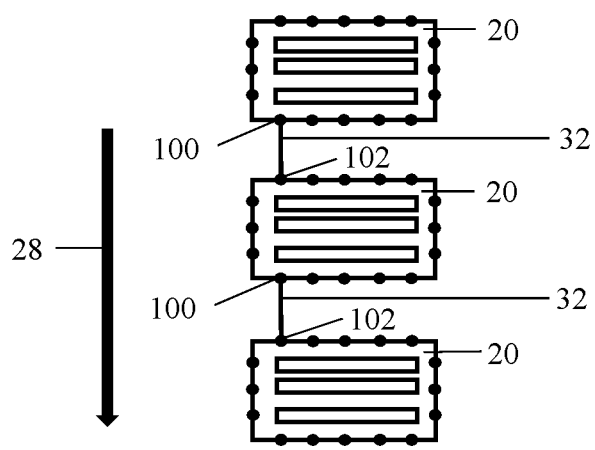
FIG. 4 depicts the link to next property/attribute and link to previous property/attribute being used to link two interlinked construct nodes to a construct.

Link to next property/attribute 100 and previous property/attribute 102: Link to ICNs 20 that are the properties/attributes of a construct. An embodiment is shown in FIG. 4. Multiple ICNs 20 are linked together like a doubly linked list. The direction of flow for property/attribute ICNs 20 is downward as shown by the arrow 28. As shown in FIG. 13, Variety and Mass are positioned below Apple and linked in a doubly linked list fashion in a downward direction, indicating that each is a property/attribute of an apple.

Figure 5:
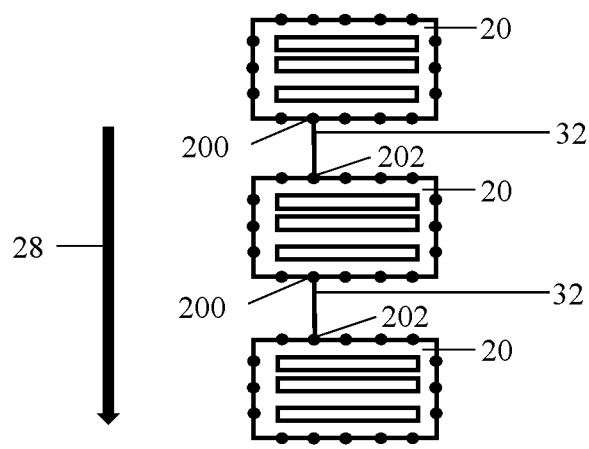
FIG. 5 depicts the link to next human sensory perception/emotion and link to previous human sensory perception/emotion being used to link two interlinked construct nodes to a construct.

Link to next human sensory perception/emotion 200 and previous human sensory perception/emotion 202: Link to ICNs 20 relating to human sensory perception of a construct and/or human emotions related to a construct. An embodiment is shown in FIG. 5. Human sensory perception refers to what a person would perceive with their senses with or without the augmentation of a device. Human emotions encompass the full spectrum of external expression, and internal thoughts and feelings. Multiple ICNs 20 are linked together like a doubly linked list. The direction of flow for human sensory perception/emotion ICNs 20 is downward as shown by the arrow 28. As shown in FIG. 13, Firmness, Texture and Color are positioned below Apple and linked in a doubly linked list fashion in a downward direction, indicating that each is related to human sensory perception. Firmness is sensed by touch. Texture is sensed by touch and sight. Color is sensed by sight.

Figure 6:
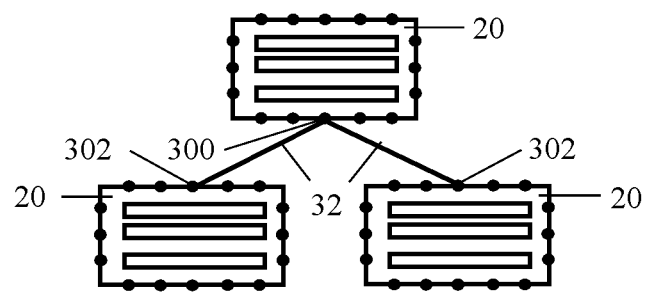
FIG. 6 depicts the link to choices and choice link being used to indicate there are two choices associated with a construct.

Link to choices 300: Links to ICNs 20 that represent choices pertaining to a construct as shown in FIG. 6. The link to choices 300 links to the choice link 302. As shown in FIG. 14, an apple is Stored either Refrigerated or Unrefrigerated. Another example shown in FIG. 14 are choices for consuming an apple Raw, Juiced, or Cooked. Choices are listed below a node in a downward direction and not linked in a doubly linked list fashion using link to choices 300, because each node represents a distinct choice.

Choice link 302: The ICN 20 represents a choice as it relates to a construct as shown in FIG. 6. The choice link 302 links to the link to choices 300 link. As shown in FIG. 6, choice link 302 is always positioned at the top of a node, and choice nodes are always positioned below a node for which they are a choice.

Link to next prerequisite/condition 400 and previous prerequisite/condition 402: Links to ICNs 20 that define prerequisites or conditions that are required to make a construct applicable to the KR. If the prerequisites or conditions are not met, a construct is not applicable to the KR. An embodiment is shown in FIG. 7-A. FIG. 7-B shows two separate prerequisites/conditions, either of which make a construct applicable. Multiple ICNs 20 that define a set of prerequisites/conditions are linked together like a doubly linked list. The direction of flow for prerequisite/condition ICNs 20 is upward as shown by the arrow 28. Using the example node for slicing an apple in FIG. 14, two nodes above the Slice node are Knife and Cutting Board. Knife and Cutting Board are positioned above the Apple and linked in a doubly linked list fashion in an upward direction to indicate that both are required to cut an apple. An alternate method of slicing an apple is a Wedge Cutting Machine shown in FIG. 14 also above the Slice node. Each separate upward link, Knife+Cutting Board or Wedge Cutting Machine is required to Slice an apple. Additional examples in FIG. 14 show that Water is required to Wash an apple, a Cooking Pot and Heat Source are required to Consume a Cooked apple, and a Juicing Machine is required to Consume a Juiced Apple.

Link to next end state/result 500 and previous end state/result 502: Link to a list of end states or results that occur as it relates to the context of a construct. An embodiment is shown in FIG. 8-A. FIG. 8-B shows an embodiment of two separate end states/results that occur from a construct, both of which are applicable. Multiple ICNs 20 that define a set of end states/results are linked together like a doubly linked list. The direction of flow for end state/result ICNs 20 is downward as shown by the arrow 28. As shown in FIG. 13, Consumed, New Tree, and Decomposes are positioned below Apple and represent three possible end states for an apple. In this example the nodes are not linked in doubly linked list fashion as each is a distinct end state.

Link to values 700: Link to ICNs 20 that contain the value associated with a construct. There can be one or more ICNs 20 containing a value as shown in FIG. 9. The link to values 700 links to the value link 702 of another ICN. The flow direction for values are left to right as shown by the arrow 28. As shown in FIG. 13, Fuji, Pippin, and Red Delicious are three values for Variety of an apple; Green, Red, and Red and Yellow are three values for Color of an apple. Note that value nodes are positioned to the right of the Variety and Color nodes, as the directional relationship to values is left to right.

Value link 702: The ICN 20 contains a value as it relates to a construct as shown in FIG. 9. The value link 702 links to the link to values 700. In FIG. 9, value link 702 is on the left side of each value node and each value node is positioned to the right of the link to values 700 to indicate the directional relationship is left to right.

Link to next sequence 800: Link to an ICN 20 that represents the first, next or last sequence of a process, behavior or event as it relates to a construct or previous sequence as shown in FIG. 10-A. FIG. 10-B shows a complex sequence that utilizes link to choices 300 and choice links 302, and links to prerequisite/condition 400 and 402. Multiple steps in a sequence are linked together like a doubly linked list. The direction of flow for sequence ICNs 20 is left to right. Shown in FIG. 14 is the process for consuming a sliced apple using the steps Wash, Slice and Consume that are linked in a doubly linked list fashion from left to right. The perquisite Water is required to Wash the apple. The prerequisites Knife and cutting board, or Wedge Cutting Machine is required to Slice the apple, and the apple is consumed by the choices Raw, Juiced or Cooked.

Link to previous sequence 802: Link to an ICN 20 that represents the previous sequence of a process, behavior, or event. Previous sequences are shown in FIG. 10-A. FIG. 10-B shows a complex sequence that utilizes link to choices 300 and choice links 302, and links to prerequisite/condition 400 and 402. The direction of flow for sequence ICNs 20 is left to right. Shown in FIG. 14 is the process for consuming a sliced apple using the steps Wash, Slice and Consume that are linked in a doubly linked list fashion from left to right. Each step is traced back to the previous step by using the link to previous sequence 802.

Any number of ICNs 20 and combination of link categories are used to expound a specific construct. FIGS. 13 and 14 shows an embodiments of a simplified partial IG for an apple that uses multiple link categories to illustrate how nodes are linked, laid out, and positioned based on link category.

An embodiment of a logical record is shown in FIG. 11. A logical record is stored (a) in random access memory (herein "RAM"), (b) in one or more tables in one or more databases, (c) in one or more flat files, (d) in one or more data interchange files such as XML or JSON, (e) in one or more class object files, or (f) a combination thereof.

Embodiments of application software that are used to create, edit and view IGs are referred to as KR editor, IG editor, ICN editor, graph editor or simply editor; (herein "editor").

Embodiments of application software that interpret and apply the knowledge contained in IGs are referred to as agents. Agents interact with users, interact with other software through an application programming interface (herein "API") or data communication interface, and interact with other agents. Agents can modify IGs based on interactions.

Embodiments of application software that convert documents, books and the contents of web pages into IGs are referred to as converters.

Embodiments of application software can load multiple IGs at the same time.

Embodiments of application software can combine general and specialized variations of editors, converters and agents into one application. Application software can import and export all or portions of an IG.

Operation

In operation one can use several types of application software to create, edit, view, interpret and apply KRs using ICNs 20:

(1) An editor application software to create, edit and view KRs using graphical embodiments of ICNs 20 on a computing device that includes methods of entering text, attaching files, specifying references to files stored locally or remotely, and specifying the link category 100-802 to link an ICN 20 to one or more other ICNs 20. This is performed with a keyboard, mouse, camera, microphone and/or device that replicates human sensory perception. A user creates KRs by searching for constructs, creating those that don't exist, and linking ICNs to expound a construct. Construct searches are performed using any of the data types that are stored in data fields 30 that are matched given the capabilities of the software and computing device. If the construct exists, the user selects the construct as an RCN 22 or DCN 24. If the construct doesn't exist, a new logical record FIG. 11 and ICN 20 is created, and the user edits the data fields 30. ICNs are automatically placed based on the link category 100-802 and direction of flow. For ease of readability and clarity, users may reposition ICNs. A user edits KRs by searching for the construct and selecting the construct for editing. The editor will display the ICNs 20 associated with the construct for editing.

(2) An agent application software that accepts input through a keyboard, mouse, camera, microphone and/or device that replicates human sensory perception. Input will activate corresponding matching ICN 20 elements within an IG FIG. 2 and the agent will do one or more of the following: (a) display one or more ICNs 20 with corresponding link category 100-802 and lines 32, (b) display or play the contents of one or more data fields 30 of an ICN 20, (c) ask one or more questions specified by an ICN 20, (d) use text to speech to read text out loud or ask a question, (e) execute computer language syntax contained in a data field, (f) send and receive commands or data, to or from, other software through an API or data communication interface, (g) control equipment through an API or data communication interface, (h) update, modify or add to the IG.

(3) A converter application software that converts documents, books and the contents of web pages into IGs. The converter uses natural language processing algorithms to process text, create ICNs 20 and determine the link categories 100-802 to link ICNs 20. Converters can capture or download images, audio files, video files, symbols, equations, formulas, digital 3D models, documents, files or reference to the storage location of these items either locally or remotely, and add them to the data fields 30 of the ICN 20.

(4) Embodiments of application software may create separate IGs to (a) facilitate input processing, (b) maintain contextual state over time, (c) maintain historical records of interactions, (d) develop physical, conceptual or cognitive models, (e) create real or imaged scenarios, (f) develop and test hypothesis, (g) plan, test, evaluate and recommend courses of action, (h) restructure or optimize an IG to improve performance or resolve ambiguity, or (i) perform mathematical and statistical operations and analysis.

(5) FIG. 12 is a flowchart explaining the process of creating a knowledge representation using the graphical embodiment of an interlinked construct node graph.

(6) The logical record FIG. 11 of an ICN 20 are stored in (a) RAM, (b) one or more tables in one or more databases, (c) one or more flat files, (d) one or more data interchange files such as XML or JSON, (e) one or more serialized class or object files, or (f) a combination thereof. Logical records can be stored in RAM as required for use and saved back into their respective repository when specified.

(7) Indexes are used to retrieve or reference logical records FIG. 11 and link categories 100-802. The ICN's 20 ID is the index key. Indexes are stored (a) in a database where their corresponding logical records are stored, and/or (b) constructed in RAM at the time corresponding logical records are loaded into memory when loaded from a repository.

(8) Image, audio recording, video recording, symbol, equation, formula, digital 3D model and document files that are attached to data fields 30 are stored (a) in a database if a database is used that supports binary storage, (b) as a binary file on a temporary or permanent storage medium, either locally or remotely, or (c) packaged with an IG similar to that of a .zip file.

(9) As logical records FIG. 11 are loaded into RAM, computer programing language pointer variables can be used to refer to the memory location of other logical records using their respective link categories 100-802.

(10) When logical records FIG. 11 are presented to a user in its graphical embodiment FIG. 2, the application software automatically sizes and positions the geometric shapes 26 and draws the lines 32 between nodes based on the link categories 100-802 as shown in FIG. 13.

(11) The number of ICNs 20 in an IG FIG. 2 can range from one to billions. The number of ICNs 20 to load locally onto a computing device's storage media and RAM need to be taken into consideration based on limitations of the computing hardware. As required, users should be able to select subject matter, form and scope of KRs to be stored locally and be able to download or access additional KRs from remote locations if available. Hardware limitations can also be addressed by specialized KR agents with ICNs 20 that are purposefully limited in number based on the subject matter.

CONCLUSIONS, RAMIFICATIONS AND SCOPE

The advantages of knowledge representation using interlinked construct nodes are that:
it's broad in purpose, form and scope;
it can breakdown any knowledge into constituent parts in a uniform and consistent manner;
it can accept a wide range of data types in addition to text;
in its graphical embodiment, the way the nodes are laid out based on paired logical record linking categories makes it easy to read, interpret and understand the knowledge that's represented, no matter how detailed or complex;
it can include lower levels of detail to facilitate completeness of understanding without diverting attention from higher level details;
it can be used within application software to exceed the capabilities of existing application software that rely on knowledge representation systems, because there are no limitations as to what type of information can be stored.

The description herein contains many detailed specifications and illustrations. These should not be construed as limiting the scope of any embodiments. For example, the number and type of link categories may differ based on the use case; other data types may be used; and addition identifiers, data fields and indexes may be added to the logical record to facilitate content search and retrieval.

The scope of the embodiments should be determined by the appended claims and their legal equivalents rather than by the illustrative examples provided herein.

SEQUENCE LISTING

Not Applicable.

The invention claimed is:

1. A method of knowledge representation comprising:
(a) using graphs with nodes comprising a plurality of arranged paired linking category connecting elements around the perimeter of said nodes that enable said nodes to be linked with other said nodes based on node category using said paired linking category connecting elements,
(b) defining a fixed plurality of said node category for said paired linking category connecting elements for all said nodes across all said graphs such that the number of said paired linking category connecting elements around said perimeter of said nodes are consistent,
(c) assigning each said linking category connecting element of said paired linking category connecting element a discrete linking direction to indicate directional relationship to other said nodes,
(d) linking said nodes in the direction specified by the said linking category connecting element to other said nodes of a specific said node category,
(e) matching said linking category connecting elements from said nodes to other said nodes of the same said node category in a doubly linked list fashion;
whereby the individual position of each said linking category connecting element explicitly defines the categorical and directional relationship between said nodes making said graphs easier to interpret and understand, the defined number of said node categories ensures information is categorized and graphed in a uniform and consistent manner across all forms and scopes of knowledge, and linking said nodes of the same said node category in a doubly linked list fashion provides the means to expound information beyond the confines of multiple data fields within a single said node.

* * * * *